United States Patent
Chang

(10) Patent No.: US 8,233,078 B2
(45) Date of Patent: Jul. 31, 2012

(54) AUTO FOCUS SPEED ENHANCEMENT USING OBJECT RECOGNITION AND RESOLUTION

(75) Inventor: E-Cheng Chang, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 550 days.

(21) Appl. No.: 12/388,760

(22) Filed: Feb. 19, 2009

(65) Prior Publication Data

US 2010/0208091 A1 Aug. 19, 2010

(51) Int. Cl.
- G03B 13/00 (2006.01)
- G03B 17/00 (2006.01)
- G03B 3/00 (2006.01)
- H04N 5/232 (2006.01)
- G02B 7/04 (2006.01)

(52) U.S. Cl. .......... 348/349; 396/79; 396/124; 396/125; 250/201.4

(58) Field of Classification Search .................. 348/349, 348/345; 396/79, 124, 125; 250/201.2, 201.4
See application file for complete search history.

(56) References Cited

U.S. PATENT DOCUMENTS

| | | |
|---|---|---|
| 2008/0205869 A1* | 8/2008 | Nose .............................. 396/77 |
| 2009/0059029 A1* | 3/2009 | Hoshii ....................... 348/222.1 |

* cited by examiner

Primary Examiner — Rochelle-Ann J Blackman
(74) Attorney, Agent, or Firm — Blakely, Sokoloff, Taylor & Zafman LLP

(57) ABSTRACT

Autofocus operations in a digital camera are described. In one embodiment, a processor detects a face in an image captured by the camera, and calculates the size of the face. It selects from amongst a number of previously stored face sizes, one that is closest to the calculated face size. It retrieves a previously stored lens focus position that is associated with the selected, previously stored face size. It signals a moveable lens system of the digital camera to move to a final focus position given by the retrieved, previously stored lens focus position. Other embodiments are also described and claimed.

21 Claims, 5 Drawing Sheets

AUTO FOCUS SPEED ENHANCEMENT USING OBJECT RECOGNITION AND RESOLUTION

FIELD OF THE INVENTION

At least certain embodiments of the invention relate generally to autofocus digital imaging devices (digital cameras), and more particularly but not exclusively to methods and apparatuses for performing a speed enhanced autofocus operation.

BACKGROUND

In order to take sharper pictures of a scene, a digital camera may be equipped with a moveable lens system that is controlled by an automatic lens focusing system or autofocus system. When the user has pressed the camera's shutter button part way, the autofocus system responds by quickly calculating the correct lens position that results in a subject in the scene being in focus, before the user has pressed the shutter button all the way (at which point a final picture of the scene is taken or accepted and then stored in the camera). Obtaining the correct focus quickly is important in digital cameras running on battery power because time and power usage should be minimized to the extent possible. The autofocus system should also work in a continuous image capture mode where the camera takes a rapid sequence of still pictures (e.g., video). For instance, in a video mode the focus is automatically adjusted in real-time as the scene changes.

The hill-dimb algorithm is often used in autofocus systems. The algorithm determines a focus state of the moveable lens system for a given scene, through digital image analysis of a series of images that are captured with the moveable lens system configured at different lens focus distances or positions. A focus value is calculated for each image in the sequence. The goal is to generate a sequence of focus values that increase in level until they pass over a peak, i.e. a "hill", which represents the best focus value for the given scene. For example, the lens focus position is adjusted automatically until certain edge detail in the image is maximized. The algorithm is shown in the diagram of FIG. 1, which illustrates the relationship between a focus sharpness and lens position according to the prior art. In FIG. 1, the abscissa indicates the focusing position of a lens along a distance axis, the ordinate indicates the focusing evaluation value (i.e., sharpness), and the curves A and B indicate the focusing evaluation values for high and low frequency components, respectively, relative to a particular in-focus position P. In order to decrease focusing response time without sacrificing focusing precision, a lens may be quickly driven in coarse adjustment steps in a low frequency range furthest from the maximum focus, and then driven in finer adjustment steps in a high frequency range nearer to the maximum focus. Once the peak of the hill is passed (curve B in FIG. 1), a high frequency bandpass filter is loaded, and the lens is moved in the opposite direction until the peak of the higher hill is found (curve A in FIG. 1). The peak focus value may use either the weighted average or peak value from numerous pixels.

Autofocus systems using the hill-climb algorithm are typically accurate in that they lead to relatively sharp pictures. Unfortunately, such autofocus systems can be relatively slow in determining a focus setting due to the large number of autofocus images that must be captured and compared. For example, an autofocus system using the hill-dimb algorithm can take up to nine (9) frames to calculate the lens focus position taking as long as 0.5 seconds to 2.0 seconds to determine focus conditions. Autofocus algorithms such as the hill-climb algorithm in general also suffer in a low-light environment since the autofocus has difficulty capturing enough edge information to properly focus.

SUMMARY OF THE DESCRIPTION

An autofocus digital camera is described which includes a moveable lens system, an image sensor coupled with the moveable lens system, a processor coupled with the image sensor, and data storage coupled with the processor. The data storage stores a table with multiple entries, each entry including a face size and a corresponding lens focus position. The processor performs an autofocus operation when taking a picture, in which the processor detects a face in an image captured by the image sensor. The size of the detected face is then calculated. A stored lens focus position is selected from the table in storage, based on the calculated face size. The moveable lens system is then signaled to move to a final lens position, which is the selected lens focus position. This enables the moveable lens system to jump directly to a lens position that is expected to result in a sharp picture of the scene, without having to go through a full sweep of lens positions.

The above summary does not include an exhaustive list of all aspects of the invention. It is contemplated that the invention includes all systems and methods that can be practiced from all suitable combinations of the various aspects summarized above, as well as those disclosed in the Detailed Description below and particularly pointed out in the claims. Such combinations may have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Several embodiments of the invention with reference to the appended drawings are now described. Whenever the shapes, relative positions and other aspects of the parts described in the embodiments are not clearly defined, the scope of the invention is not limited only to the parts shown, which are meant merely for the purpose of illustration. Also, while numerous details are set forth, it is understood that some embodiments of the invention may be practiced without these details. In other instances, well-known circuits, structures, and techniques have not been shown in detail so as not to obscure the understanding of this description.

In accordance with an embodiment of the invention, an autofocus process running in a digital camera detects a single face in a scene at which the lens system of the camera is aimed, calculates the size of the face, and uses the calculated face size to look up a stored lens focus position in a previously populated, autofocus table. Before describing the autofocus process itself, in connection with FIG. 4 and FIG. 5, an example process for building the look up table is described with the aid of FIG. 2. Briefly, that process uses a particular digital camera to take multiple, in-focus pictures of a face, at different distances from the camera. The particular camera may be a specimen of a camera design in which the table will be stored, e.g. during a high volume manufacturing process to produce production versions of the camera design. The face size for each in-focus picture is calculated and stored in a respective entry of the table. The lens focus position that yields the in-focus picture is also noted and stored in the respective entry of the table.

Figure 1:
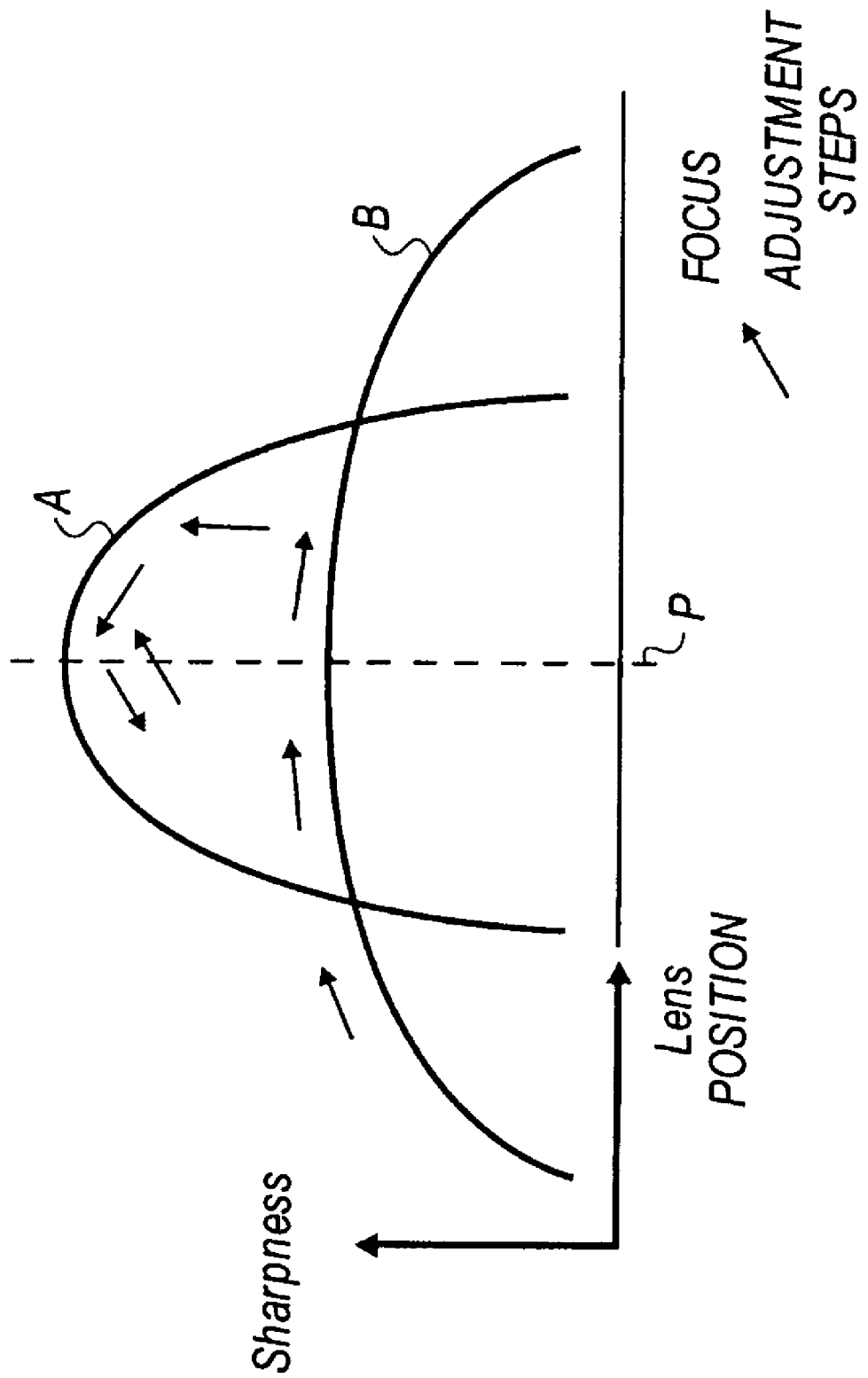
FIG. 1 illustrates the hill-climb algorithm relationship between a focus sharpness and lens position according to the prior art.
Figure 2:
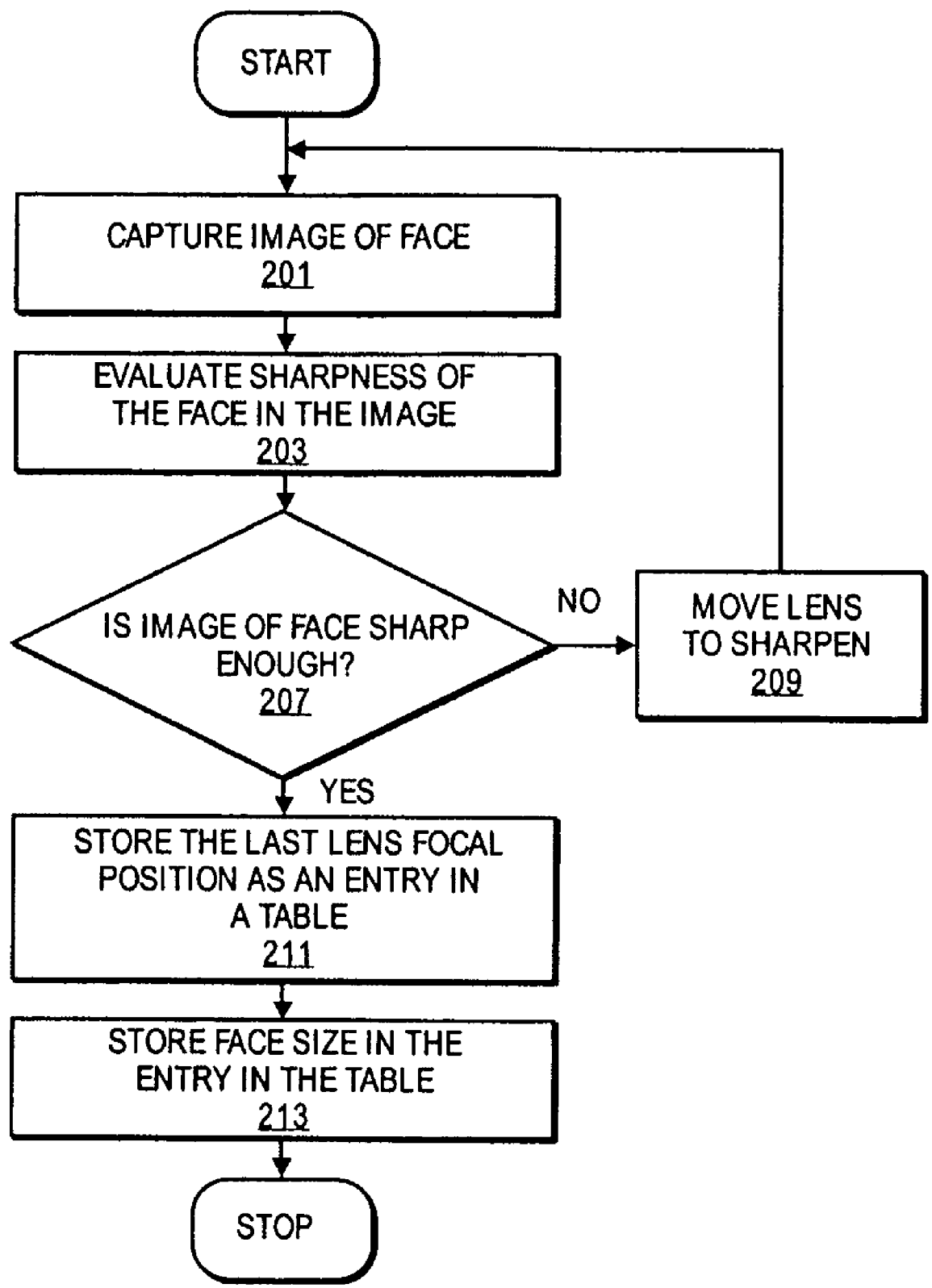
FIG. 2 illustrates an example method for building an autofocus look up table.

Referring now to FIG. 2, details of a process 200 for building the table of focus lens positions are now given. The process may begin by using a digital camera to capture an image of a typical human face (or other object that has similar features such as eyes, eyebrows, and nose, and similar shape and size) that has been positioned at a given distance from the camera (operation 201). The particular camera here is preferably a specimen of a design that will be high volume manufactured, with the table being stored in each production version of the design.

Note that in operation 201, the image of the face is captured with the camera's lens system at a particular angle of view. If the camera design has a zoom lens, such that it can be configured (by a purchaser or end-user of the production version) with different angles of view, then in that case the table being built may be associated with a particular angle of view setting. In that embodiment, the lens system's angle of view setting should be kept the same for all entries in the table. For camera designs with a zoom lens, the process 200 can be repeated to build multiple tables, each to be used with a different angle of view setting that is available with the zoom lens. These multiple tables would be then stored in each production version of the camera design with the zoom lens.

Once the image has been captured in operation 201, the sharpness of the image of the face is evaluated (operation 211), to determine if the image of the face is in-focus (operation 207). Sharpness may be determined manually by a human inspecting the image, or automatically by a machine performing for example any suitable edge or contrast detection algorithm. If the image of the face is sufficiently sharp, the last lens focus position is read and stored as an entry in the table (operation 211).

Figure 3:
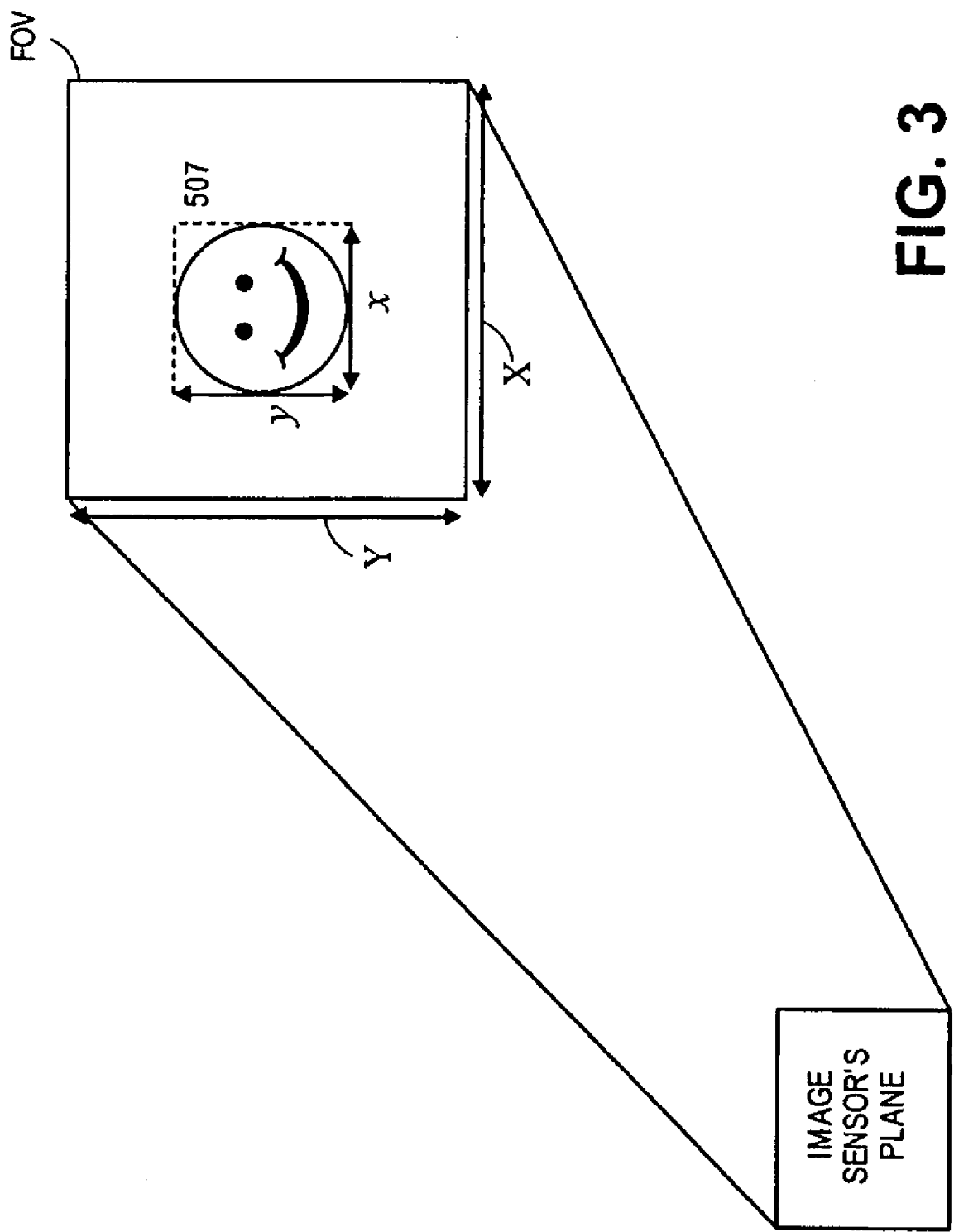
FIG. 3 is a diagram of a detected face image in a picture, relative to the field of view when the picture was taken.

The face size is also calculated and then stored in the same entry (operation 213), thereby associating a stored face size with a stored lens focus position in the table. Although multiple faces may be present in a given scene, the process 200 uses a single face (from amongst two or more faces that may be in the scene) based on which the face calculation may be made. Referring now to FIG. 3, the face size may be calculated directly from the face image 507 present in the in-focus picture, and may be given as a percentage of the field of view, FOV (that is covered by the face in the image). The FOV may be calculated using known techniques, based on a combination of lens system parameters, image sensor parameters and the distance from the lens to the object (face) in the particular scene.

If the image of the face is not sufficiently sharp, a mechanical autofocus operation is performed to move a lens of the camera (operation 209), e.g. by a predetermined step. The process 200 then continues with repeating operations 201, 203, and 207, until a sufficiently sharp image of the face is obtained (and the last lens focus position that resulted in the in-focus image is read and stored in the table).

The autofocus table may be populated by repeating the process 200 several times, each time for a different scene (that contains one or more faces). This results in multiple table entries each for a different combination of face size and lens focus position. For example, several close-up or portrait scenes can be defined, where each scene has a person located at a different distance from the camera; one or more group shots may also be defined for scenes in which there are several persons (multiple faces), where in each scene the persons are located at a different distance from the camera. The table will thus have a number of entries, arranged for example sequentially, from smallest face size to largest face size. As an example, consider the table below in which each entry has at least two fields. One field indicates face size (here, as a percentage of the FOV that is covered by the detected face), while the associated field indicates the corresponding lens focus position (here in millimeters). Note that as an alternative, rather than computing the percentage of FOV, each face size may simply be indicated by the x and y dimensions of the smallest rectangle or square in which the detected face fits (see FIG. 3).

| Percentage of FOV Covered by Detected Face | Lens Focus Position |
| --- | --- |
| 5% | 2.00 mm |
| 10% | 1.86 mm |
| 15% | 1.51 mm |
| 20% | 1.22 mm |
| 25% | 1.01 mm |

Figure 4:
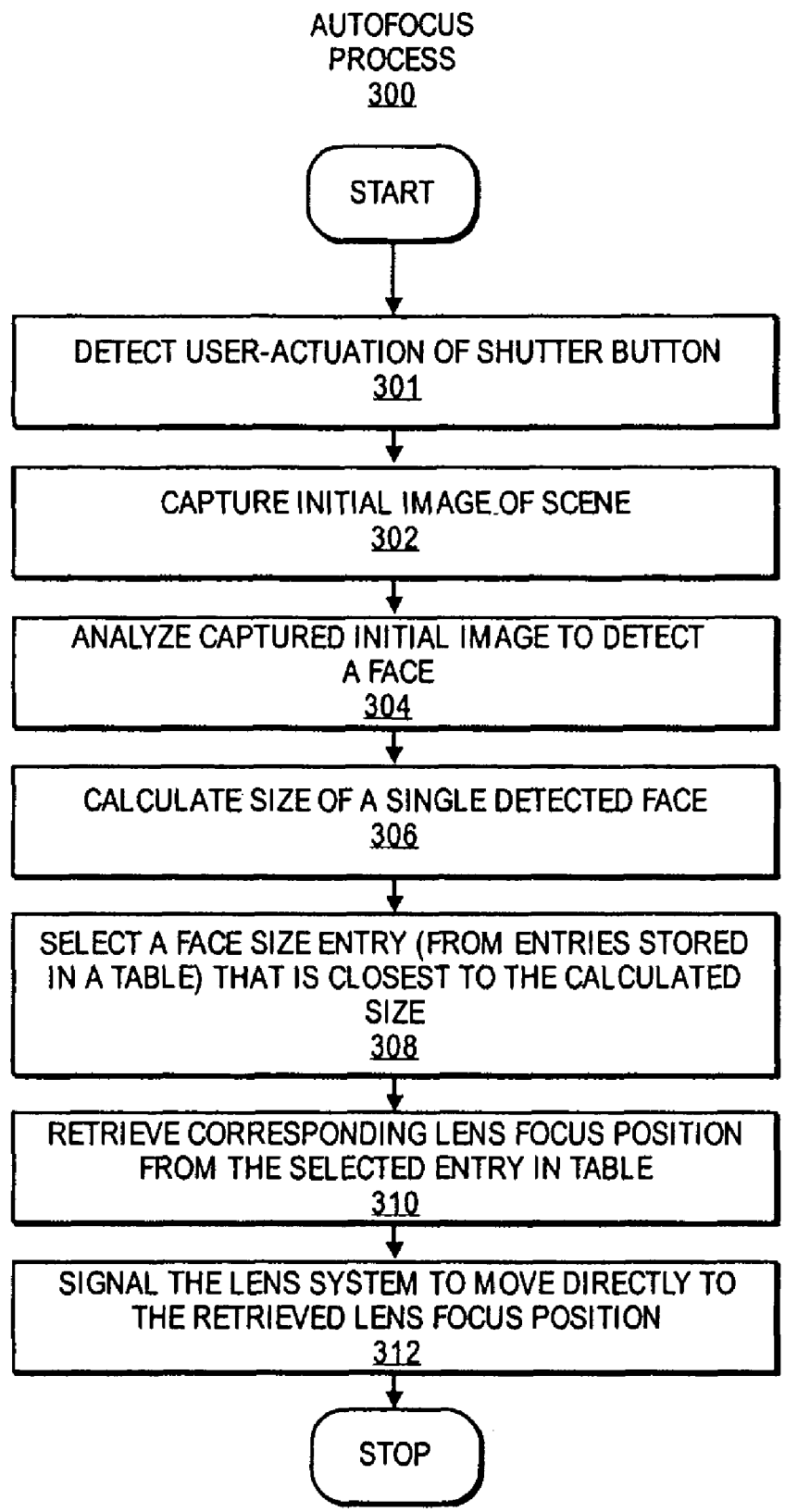
FIG. 4 illustrates a method to perform an autofocus operation in accordance with an embodiment of the invention.

Once the table has been stored in the digital camera, the following autofocus process can be performed whenever a picture of a scene is to be taken with the camera. A processor in the camera automatically detects a single face in the scene, calculates the size of the detected face and then retrieves a lens focus position from the table, based on the calculated face size. The camera then directly "jumps" to the retrieved, lens focus position which becomes the final lens focus position for taking the picture, without having to go through a full autofocus algorithm sweep. FIG. 4 illustrates the details of an example of such an autofocus process 300. The process 300 could be initiated, for example, when a user is taking a still picture using the camera, between when the user just starts to press the camera's shutter button part way, until he has pressed the button all of the way. Alternatively, the process 300 could be initiated automatically for selected "frames", e.g. by a digital camera that has motion capture or video capability.

Turning now to FIG. 4, the process 300 begins with operation 302 where the camera captures an initial image of the scene. In still capture mode, operation 302 may be preceded by operation 301 in which the camera detects that its user has just started to press the shutter button. The captured initial image is then analyzed in operation 304, to detect faces therein (note there may be multiple faces that are detected in the image, but just one of them may be sufficient for the subsequent face size calculation). Any suitable face detection algorithm may be used. The size of a single, selected face is calculated (operation 306). This may be done by, for example, counting the number of pixels that form the face, or estimating the face size more roughly by measuring the x and y pixel dimensions of the smallest rectangle or square in which the face can fit, and then relating those quantities to actual distance dimensions or the FOV for that image. A ratio of the area taken up by the single face to the total area of the FOV may be calculated. The ratio may alternatively be given as a percentage of the particular FOV (used for taking the initial image) that is covered by the single face.

Once the face size has been calculated, a face size entry is selected, from the stored autofocus table containing a number of such entries, that is closest to the calculated face size (operation 308). The corresponding or associated lens focus position is retrieved from the selected table entry (operation 310). The camera's optical or lens system is then signaled to move directly to the retrieved lens focus position (operation 312). Once the optical system has responded to this signal by automatically moving its lens accordingly, the camera is now ready to take a picture of the scene. Note, however, that in some cases the capture of the final picture may be delayed, e.g. until after the user has pressed the shutter button all of the way. At least the selected, single face should appear relatively sharp in the final picture. The process 300 is advantageous because it may add a noticeable speed enhancement to the entire picture taking operation.

Figure 5:
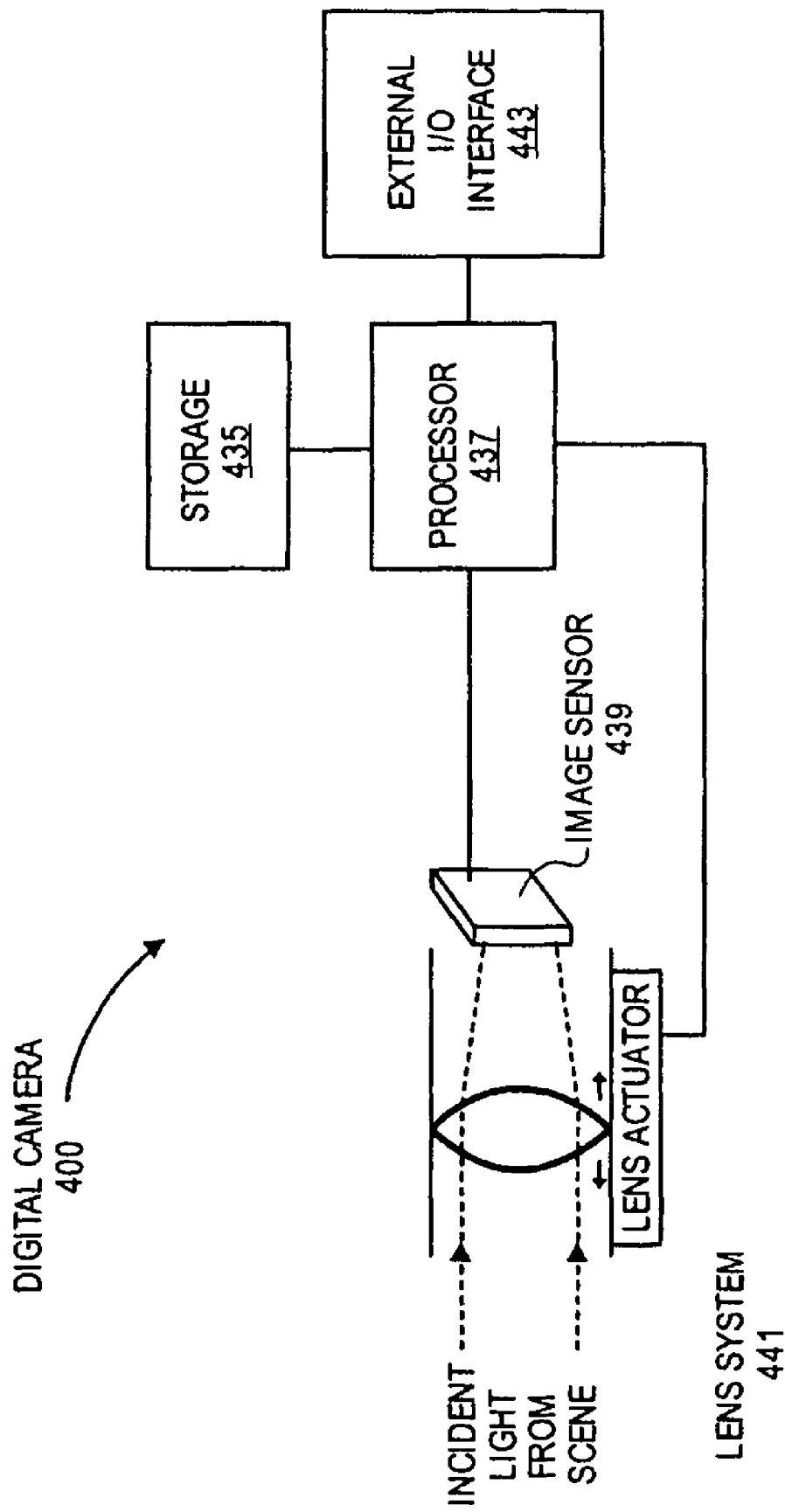
FIG. 5 is a block diagram of an example autofocus digital camera.

FIG. 5 is a block diagram of a digital camera in which an embodiment of the invention is implemented. In the illustrated embodiment, the camera 400 includes a lens system 441 having a lens actuator that can be signaled automatically to move a lens so as to focus incident light from a scene, an image sensor 439 coupled with the lens system 441 to receive the focused incident light and in response produce a digital image thereof, a processor 437 coupled to control the image sensor 439, data storage 435 coupled with the processor to store a digital image captured by the sensor 439, and an external input/output interface 443 through which the processor 437 can communicate with devices external to the camera 400. The processor may comprise any suitable embedded microprocessor or state machine that can manage overall operations of the camera. For example, the camera may be a "thin" device with minimal functionality (such as a personal computer peripheral "Web" camera), where the processor is a hardwired state machine that responds to commands received from the external I/O interface 443, the latter being a personal computer serial communications interface such as a Universal Serial Bus port. Alternatively, the camera may be embedded in a smart phone handset, in which case the processor 437 could be an embedded applications processor in the handset. The storage 435 may include nonvolatile solid-state random access memory and/or other suitable data storage in which one or more software or firmware programs are stored for execution by the processor 437. These stored programs include an autofocus table as described above, having multiple entries each of which associates a different face size with a corresponding lens focus position of the lens system 441. The stored programs may also include instructions or machine code that program the processor 437 to perform some of the autofocus operations described above in connection with FIG. 4. In particular, those operations may be performed automatically by the processor 437, except for the image capture operation 302 which would be performed by the image sensor 439 (under control of the processor 437).

Unless specifically stated otherwise as apparent from the discussion set forth above, it is to be appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's storage into other data similarly represented as physical quantities within the computer system or other such information storage, transmission or display device.

Embodiments of the invention may include various operations as set forth above or fewer operations or more operations or operations in an order which is different from the order described herein. The operations may be embodied in machine-executable instructions which cause a general-purpose or special-purpose processor to perform certain operations. Alternatively, these operations may be performed by specific hardware components that contain hardwired logic for performing the operations, or by any combination of programmed computer components and custom hardware components.

Throughout the foregoing description, for the purposes of explanation, numerous specific details were set forth in order to provide a thorough understanding of the invention. It will be apparent, however, to one skilled in the art that the invention may be practiced without some of these details. For example, in FIG. 3, the calculated size of the detected face image 507 may be given or estimated as $x*y$, where x and y are the dimensions of the smallest rectangle or square in which the detected face image 507 fits. Alternatively, the size of the detected face 507 may be given as simply the pair of dimensions, (x,y). As another alternative, the calculated face size may be given in relation to the FOV, e.g. by the ratio $x*y/(X*Y)$ where X and Y are the distance dimensions of a rectangular or square shaped FOV. Accordingly, the scope and spirit of the invention should be judged in terms of the claims that follow as well as the legal equivalents thereof.

What is claimed is:

1. An autofocus digital camera comprising:
   a moveable lens system;
   an image sensor coupled with the moveable lens system;
   a processor coupled with the image sensor; and
   data storage coupled with the processor and having stored therein a table, the table having a plurality of entries, each entry including a stored face size and a corresponding stored lens focus position,
   wherein the processor is to perform an autofocus operation when taking a picture, wherein in the autofocus operation, the processor is to detect a face in an image captured by the image sensor, calculate size of the face, select a stored lens focus position from the table based on the calculated face size, and signal the moveable lens system to move to the selected stored lens focus position,
   and wherein the processor is to signal the image sensor to take the picture once the moveable lens system is at the selected stored lens focus position.

2. The apparatus of claim 1, wherein the stored face size is given by a percentage of field of view taken up by the detected face.

3. The apparatus of claim 1 wherein the memory stores a second table of stored face sizes and corresponding stored lens focus positions, the second table being for an angle of view that is different from that of the first table, the processor to perform the autofocus operation by further determining a current angle of view and selecting a table from among the first table and the second table based on the current angle of view.

4. The apparatus of claim 1, wherein the processor comprises:
   a face detector to detect a face in an image captured by the image sensor; and
   a measurement unit to measure a size of the detected face in the image.

5. The apparatus of claim 4 wherein the processor comprises:
a calculation unit to determine a percentage of a field of view covered by the face, based on the measured size of the face in the image.

6. The apparatus of claim 1, wherein the storage stores machine-code that programs the processor to perform the autofocus operation.

7. A method for performing an autofocus operation in a digital camera, comprising:
capturing an image of a scene;
detecting a face in the captured image;
calculating size of the detected face;
selecting from amongst a plurality of previously stored face sizes one that is closest to the calculated face size;
retrieving a previously stored lens focus position that is associated with the selected one of the previously stored face sizes; and
signaling a moveable lens system of the digital camera to move to a final focus position given by the retrieved, previously stored lens focus position,
wherein the plurality of previously stored face sizes and the previously stored lens focus positions are stored prior to capturing the image of the scene.

8. The method of claim 7 further comprising:
determining angle of view used when capturing the image; and
selecting a group of previously stored face sizes and associated lens focus positions, from amongst a plurality of such groups, that are associated with the determined angle of view.

9. The method of claim 8 further comprising:
calculating field of view used when capturing the image, and wherein
calculating the size of the detected face comprises measuring the area of the detected face in relation to the calculated field of view.

10. The method of claim 9 wherein calculating the size of the detected face comprises calculating a ratio of the measured area of the detected face to the calculated field of view.

11. The method of claim 8, wherein calculating the size of the detected face comprises measuring dimensions of the smallest rectangle or square in which the detected face fits.

12. The method of claim 8, wherein the stored face size is given by a percentage of a field of view covered by the face in the captured picture.

13. The method of claim 12, wherein the memory stores instructions that program the processor to perform the autofocus operation.

14. An article of manufacture for use when performing an autofocus method using a moveable lens system, comprising: storage that stores a first table having a plurality of entries, each entry containing a different face size and an associated lens focus position for the moveable lens system,
wherein the storage stores machine code which programs a processor to select one of the entries in the first table based on a calculated face size, retrieve the associated lens focus position from the selected entry, signal the moveable lens system to move to a final focus position given by the retrieved lens focus position and signal an image sensor to take a picture once the moveable lens system is at the final focus position.

15. The article of manufacture of claim 14, wherein the storage stores a second table having a plurality of entries each containing a different face size and an associated lens focus position for the moveable lens system, the second table being associated with a different angle of view than the first table.

16. A method for building a look up table, comprising:
a) capturing an image of a face using a moveable lens system that is set to a lens focus position;
b) evaluating sharpness of the captured face in the image;
c) when the sharpness is sufficient, storing the lens focus position in a first look up table and storing size of the captured face in the look up table in association with the stored lens focus position;
d) when the sharpness is not sufficient, signaling the lens system to move to a different lens focus position and repeating a)-b) with the moveable lens system set to the different lens focus position; and
e) repeating c)-d) at least once.

17. The method of claim 16, further comprising:
repeating a)-e) with the moveable lens system set to a different angle of view, to build a second look up table associated with said different angle of view; and
storing the first and second look up tables in a digital camera.

18. The method of claim 16, wherein evaluating sharpness of the captured face in the image comprises:
performing an automatic sharpness evaluation process upon the captured image.

19. The method of claim 16, further comprising:
detecting the face in the captured image and calculating the size of the face, by analyzing the captured image.

20. The method of claim 19, wherein calculating the size of the face comprises:
measuring dimensions of the smallest rectangle or square in which the detected face fits.

21. The method of claim 19, wherein calculating the size of the face comprises:
calculating a ratio of a measured area of the detected face to a field of view.

* * * * *